(12) United States Patent
Frumker et al.

(10) Patent No.: US 7,154,085 B2
(45) Date of Patent: Dec. 26, 2006

(54) OBJECT DETECTION METHOD AND SYSTEM

(75) Inventors: Evgeny Frumker, Beer-Sheva (IL); Eliezer Rosenblum, Haifa (IL); Ezra Shamay, Kiriat Bialik (IL)

(73) Assignee: Rafael Armament Development Authority, Ltd., Haifa (IL)

( * ) Notice: Subject to any disclaimer, the term of this patent is extended or adjusted under 35 U.S.C. 154(b) by 0 days.

(21) Appl. No.: 11/222,772

(22) Filed: Sep. 12, 2005

(65) Prior Publication Data

US 2006/0006314 A1    Jan. 12, 2006

Related U.S. Application Data

(62) Division of application No. 10/086,643, filed on Mar. 4, 2002, now Pat. No. 6,943,337.

(30) Foreign Application Priority Data

Jun. 12, 2001   (IL)   ..................... 143695

(51) Int. Cl.
  *G02B 27/12*   (2006.01)
  *G01D 5/38*    (2006.01)
(52) U.S. Cl. .................. 250/237 G; 250/216; 359/639; 362/331
(58) Field of Classification Search ............ 250/221, 250/216, 237 R, 237 G; 359/569, 639, 640, 359/837; 362/308, 309, 326, 331, 336
See application file for complete search history.

(56) References Cited

U.S. PATENT DOCUMENTS

| 3,809,480 | A | 5/1974 | Somerville |
| 3,955,082 | A | 5/1976 | Dyment |
| 4,185,192 | A | 1/1980 | Wagner |
| 4,317,992 | A | 3/1982 | Stauffer |
| 4,396,945 | A | 8/1983 | DiMatteo et al. |
| 4,547,074 | A | 10/1985 | Hinoda et al. |
| 4,590,410 | A | 5/1986 | Jönsson |
| 4,643,578 | A | 2/1987 | Stern |
| 4,724,480 | A | 2/1988 | Hecker et al. |
| 6,927,919 | B1 * | 8/2005 | Hwang ........................ 359/641 |

FOREIGN PATENT DOCUMENTS

| DE | 44 06 906 A1 | 9/1995 |
| EP | 0 372 204 A2 | 6/1990 |
| JP | 59-119311 A | 7/1984 |
| WO | WO 97/03377 A1 | 1/1997 |

* cited by examiner

*Primary Examiner*—Kevin Pyo
(74) *Attorney, Agent, or Firm*—Browdy and Neimark, PLLC

(57) ABSTRACT

A method and system for monitoring a region of interest are presented. Incident radiation is transmitted towards the region of interest with a certain transmitting angle and with a predetermined angular intensity distribution of the incident radiation. The transmitting angle defines a plane of propagation of the incident radiation, the region of interest being located within this plane. Reflections of the incident radiation are collected with a solid angle of collection intersecting with said plane. A region of intersection presents a detecting window of a predetermined geometry containing at least a portion of the region of interest. The collected radiation coming from within the detecting window is detected, and output signals indicative thereof are generated.

15 Claims, 3 Drawing Sheets

OBJECT DETECTION METHOD AND SYSTEM

CROSS-REFERENCE TO RELATIVE APPLICATIONS

The present application is a division of U.S. application Ser. No. 10/086,643, filed Mar. 4, 2002, now U.S. Pat. No. 6,943,337.

FIELD OF THE INVENTION

This invention is generally in the field of proximity sensing techniques, and relates to a method and system for monitoring a region of interest to detect an object therein.

BACKGROUND OF THE INVENTION

Proximity sensing systems aimed at object detection in general are well known per se and are found in wide use in commercial, police and military applications. Generally, such systems fall into two broad categories of systems: "active" systems based on signal transmission towards an object and detection of signals returned (reflected) from the object, and "passive" systems that do not utilize energy transmission towards a target to be detected (e.g., infrared or heat-seeking systems).

U.S. Pat. No. 4,185,192 discloses a passive optical system utilizing two detectors oriented such that their optical axes and cone shaped fields of view intersect, thereby creating an overlapping region between these fields of view. By this, only those signals from the detectors, which are received simultaneously, being thereby indicative of that the detected light comes from the overlapping region, will cause the generation of a switching signal.

Another example of such a passive optical system for determining the presence of an object by utilizing the creation of a scene at the intersection of two optical paths associated with two detectors is disclosed in U.S. Pat. No. 4,317,992.

U.S. Pat. No. 4,396,945 discloses the technique that can be utilized in either an active or passive system for determining the position and orientation of an object in space. This technique is based on the determination of the intersection of a line with a plane or with another line.

Active systems are also disclosed in U.S. Pat. Nos. 4,590,410 and 4,724,480. According to the technique of U.S. '410, which is aimed at detecting small objects, multiple light emitters and multiple light detectors are utilized. According to the technique of U.S. '480, a system is composed of at least one projector generating a non-planar light and at least one camera, which are oriented such that the optical axes of the camera(s) and projector(s) intersect. By this, the projector associated with a first object and the region of intersection associated with a second object can be aligned.

SUMMARY OF THE INVENTION

There is a need in the art to facilitate the detection of an object in a region of interest by providing a novel method and system for monitoring a region of interest.

The main idea of the present invention consists of defining a detecting window of a known location containing a region of interest to be monitored so as to detect objects located solely within the detecting window, and prevent monitoring of regions outside the detecting window. This is implemented by transmitting incident radiation towards the region of interest with a certain transmitting angle so as to define a plane of propagation of the incident radiation, and collecting radiation with a solid angle of collection intersecting with this plane. The detecting window is thus a plane-like region of intersection between the angle of collection and the plane of transmission. In order to optimally use the energy and maximize the signal-to-noise ratio (SNR) in detected radiation, the incident radiation is transmitted towards the region of interest with a certain predetermined angular intensity distribution.

It should be understood that the term "monitoring" used herein signifies observing or sensing the region of interest either to simply detect the appearance or existence of an object within the detecting window (region of interest), or to enable imaging of the region of interest. For example, a detector may be of that kind producing generated data indicative of the detected reflections in the form of an indication signal (alarm) indicative of the fact that an object exists in the detecting window. To enable the imaging of an object located within the detecting window, an appropriate detector (i.e., having a sensing surface in the form of one- or two-dimensional array of pixels) and an image processing technique should be used.

There is thus provided, according to one aspect of the present invention, a method for monitoring a region of interest, the method comprising the steps of:

(i) transmitting incident radiation towards the region of interest with a certain transmitting angle to define a plane of propagation of the incident radiation, and with a predetermined angular intensity distribution of the incident radiation, the region of interest being located within said plane;

(ii) collecting reflections of the incident radiation with at least one solid angle of collection intersecting with said plane, a region of intersection being a detecting window of a predetermined geometry containing at least a portion of said region of interest;

(iii) detecting the collected radiation coming from within said detecting window and generating output signals indicative thereof.

Preferably, to provide the predetermined angular intensity distribution of the incident radiation, a transmitter unit comprises a specifically designed beam-shaping element.

Preferably, in order to increase the quality of detection, the sensitivity distribution of a receiver unit within the sensing surface of a detector is adjusted so as to provide substantially uniform output of the receiver unit for collected radiation components coming from different locations within the detecting window. Additionally, the sensing surface of the receiver unit can be divided into a plurality of spatially separated sensing regions, each for collecting a corresponding one of the solid angle segments of the collection angle of the receiver unit.

According to another aspect of the present invention, there is provided a system for monitoring a region of interest, the system comprising:

(a) a transmitter unit operable to transmit incident radiation with a certain transmitting angle defining a plane of propagation of the incident radiation, and with a predetermined angular intensity distribution of the incident radiation, said region of interest being located within said plane; and (b) at least one receiver unit oriented and operable to collect reflections of the incident radiation with at least one certain solid angle of collection intersecting with said plane, a region of intersection being a detecting window of a predetermined geometry containing at least a portion of said region of interest, to detect the collected radiation coming from within said detecting window, and generate data indicative thereof.

Preferably, in order to prevent stray light (particularly, solar radiation) from reaching the receiver unit, and prevent the reflection of the incident radiation from the ground, the receiver and transmitter units are oriented such that the field of view of the receiver, while being directed towards the detecting window, extends downwards from the horizon, and the incident radiation, while propagating towards the detecting window, is directed upwards from the horizon. For the same purpose, namely, to prevent the stray light from being detected, an additional receiver unit can be used to collect the reflections of the incident radiation coming from within the detecting window, but with a different collection angle. For example, the two receivers are oriented such that their collection angles are symmetrical with respect to the detecting window plane. This arrangement prevents the direct solar radiation from being detected simultaneously by the two receiver units.

Generally, more than one receiver units may be provided being associated with the same transmitter unit and being operable for receiving radiation components propagating with a corresponding one of solid angle segments of said solid angle of collection. More than one transmitter units may be provided associated with a corresponding number of the receiver units, thereby monitoring the corresponding number of portions (detecting windows) of the region of interest.

The transmitter unit comprises a radiation source (preferably a laser diode) generating the incident radiation of a predetermined spectral range, a collimator, and a beam-shaping element providing the desired angular intensity distribution of the incident radiation. The beam-shaping element is of a refractive type, and is composed of one or more refractive blocks. Each of the refractive blocks has a first active surface facing the radiation source, a second active surface and an active medium enclosed between the first and second surfaces, and is formed by an array of facets. The orientation of a surface region of the first active surface defined by the facet with respect to the second active surface and a length of this surface region are defined by the angular intensity distribution of the incident radiation to be created by the radiation propagation through this specific facet.

Thus, according to yet another aspect of the present invention, there is provided a beam-shaping element for use in a transmitter unit for transmitting radiation with a predetermined angular intensity distribution, wherein the beam-shaping element comprises at least one refractive block having a first active surface for facing a radiation source of the transmitter unit, a second active surface and an active medium enclosed therebetween;

the first active surface of said at least one refractive block is formed by an array of facets, orientation of a surface region of the first active surface defined by each of the facets with respect to the second active surface and a length of said surface region being defined by the predetermined angular intensity distribution, $I(\theta)$, of the transmitted radiation to be produced by radiation propagation through said at least one refractive block, $\theta$ being a steering angle created by the facet of the refractive block.

Preferably, the beam-shaping element is also designed so as to be very robust to linear intensity variation of the emitted radiation at the entrance of the beam-shaping element (at the first active surface). To this end, the array of facets is composed of two sets, which are symmetrically identical with respect to the central axis of the refractive block.

The receiver unit comprises a spectral filter preventing the detection of radiation outside said predetermined frequency spectral range, a radiation collecting assembly and a detector. A sensing surface of the detector has a predetermined geometry selected in accordance with the geometry of the detecting window (region of interest). The detector is implemented with a specifically constructed variable sensitivity filter, such that the output of the detector is substantially uniform for the collected reflections coming from different locations in the detecting window. This filter also reduces the overall stray light (background radiation) and back-scattered radiation from particles that may occasionally exist in the detecting window and scatter light towards the receiver unit.

Thus, according to yet another aspect of the present invention, there is provided a detector for use in a system for monitoring a region of interest, the detector comprising a radiation collecting assembly, and a sensing surface for receiving collected radiation and generating output representative thereof, wherein the sensing surface has a desirably variable sensitivity distribution such that the output signals corresponding to the collected radiation components coming from different locations within said region of interest are substantially equal.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
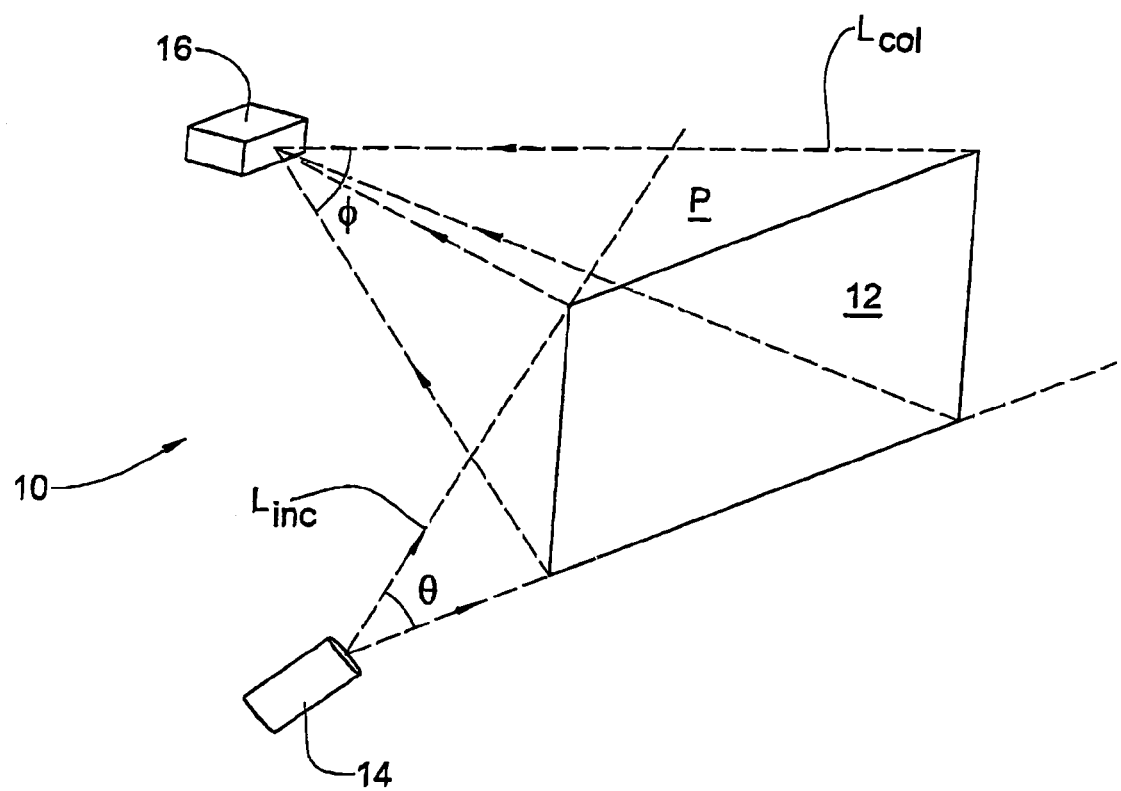
FIG. 1 is a schematic illustration of the main components of a system according to the invention.

Referring to FIG. 1, there is illustrated a system 10 according to the invention for monitoring a region of interest 12, namely, for detecting the appearance or existence of an object within this region (detecting window). The system 10 comprises such main constructional parts as a transmitter unit 14 for generating incident radiation (light) and transmitting it towards the region of interest 12 (detecting window), and a receiver 16 unit for receiving reflections of the incident radiation coming from the region of interest 12 and generating data indicative thereof.

The transmitter unit 14 generates an incident light beam $L_{inc}$ of a predetermined spectral range and transmits it with a certain acute angle of propagation $\theta$ and certain angular intensity distribution of the incident light. The incident light beam has a substantially plane shape (the so-called "sheet of light"), and the region of interest 12 is located in this plane P. The receiver unit 16 collects light $L_{col}$ (of the predetermined spectral range) with a solid angle of collection $\phi$.

The detecting window 12 presents a region of intersection between the plane P (defined by the transmitter unit 14) and the solid angle of light collection φ (defined by the receiver unit 16). In other words, the detecting window 12 is a region cut by the solid angle of light collection φ from the plane P. In the present example, the solid angle of collection φ has a rectangular cross-section, thereby defining a rectangular shape of the detecting window 12.

It should be understood that what the receiver unit 16 actually receives are reflections of the incident light produced within a region defined by the detecting window 12 (i.e., light reflected from an object located within the window 12). The system 10 is thus capable of monitoring the detecting window containing the region of interest, i.e., detecting, and possibly also imaging, objects located within the detecting window 12, while not detecting any object located outside this window.

With regard to the preferred relative position of the transmitter and receiver units, the following should be noted. The receiver unit 16 is oriented such that its field of view, while being directed towards the detecting window 12, extends downwards from the horizon. The transmitter unit 14 is oriented such that the incident radiation, while propagating towards the detecting window 12, is directed upwards from the horizon.

The above positioning of the transmitter and receiver units 14 and 16 is associated with the following. On the one hand, when stray light (in particular, the solar radiation) directly reaches the sensing surface of a detector, it causes the saturation of the detector. On the other hand, the reflections of incident laser radiation from the ground can reach the sensing surface of a detector, thereby causing a false alarm thereof. By locating the transmitter and receiver units in the above-described manner, the solar radiation is prevented from reaching the detector (irrespective of the current location of the Sun), and the incident radiation is prevented from reaching the ground.

It should be noted, although not specifically shown, that, in order to prevent the stray light from being detected, the system may comprise an additional receiver unit constructed similar to the receiver unit 16, but oriented to collect the reflections of the incident radiation coming from within the detecting window 12 symmetrical to that of the unit 16 with respect to the detecting window plane. This arrangement prevents the direct solar radiation from being detected simultaneously by the two receiver units.

Generally, the system may comprise more than one receiver unit associated with the same transmitter and operable together to collect the reflections of the incident radiation from the detecting window with the solid angle of light collection φ. In this case, each of the receiver units collects a light component propagating with a corresponding one of the angular segments of the entire solid angle of light collection φ.

It should also be noted that, in order to monitor the entire region of interest, the system may comprise more than one transmitter unit, each being associated with one or more receiver unit. In this case, each transmitter-receiver arrangement is associated with a corresponding one of the detecting windows that cover together the entire region of interest. In other words, the entire region of interest can be monitored by dividing it into a number of detecting windows, and detecting the reflections coming therefrom by the corresponding number of the transmitter-receiver arrangements.

Figure 2:
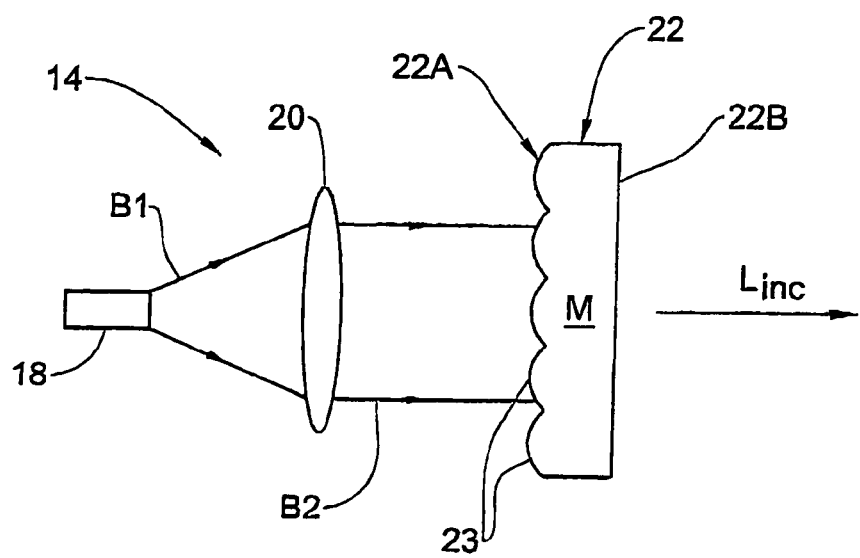
FIG. 2 illustrates the construction of a transmitter unit of the system of FIG. 1.

FIG. 2 illustrates the main constructional elements of the transmitter unit 14. The transmitter unit 14 is composed of a laser diode (radiation source) 18 operating with the predetermined spectral range, an aspheric collimating lens 20, and a beam-shaping element 22. A light beam $B_1$ emitted by the laser diode 18 is collimated by the lens 20, and the passage of collimated light $B_2$ through the element 22 produces the incident sheet of light $L_{inc}$. It should be understood that the light propagation is shown here schematically, in order to simplify illustration.

For the purposes of the present invention, the beam-shaping element 22 is of a refractive type, having two active surfaces 22a and 22b enclosing an active medium M with the refraction index n therebetween. The element 22 is formed of one or more blocks, five such blocks, generally at 23, being shown in the present example. By using two active surfaces, the maximum angle of propagation of the incident radiation produced by the beam-shaping element can be increased. The beam-shaping element 22 is designed using a specific algorithm, so as to provide desired angular intensity distribution of the incident light. Additionally, the beam-shaping element is designed so as to be very robust to laser intensity variations. As for the aspherical collimating lens 20, its design is optimized for actual laser junction to achieve maximum collimation capability.

Figure 3A:
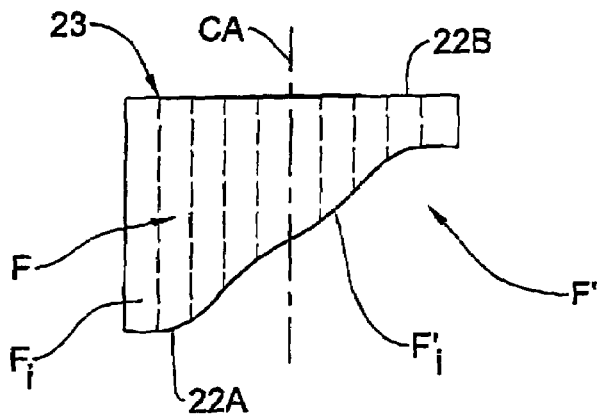
FIGS. 3a to 3c more specifically illustrate the features of a beam-shaping element of the transmitter unit of FIG. 2.
Figure 3B:
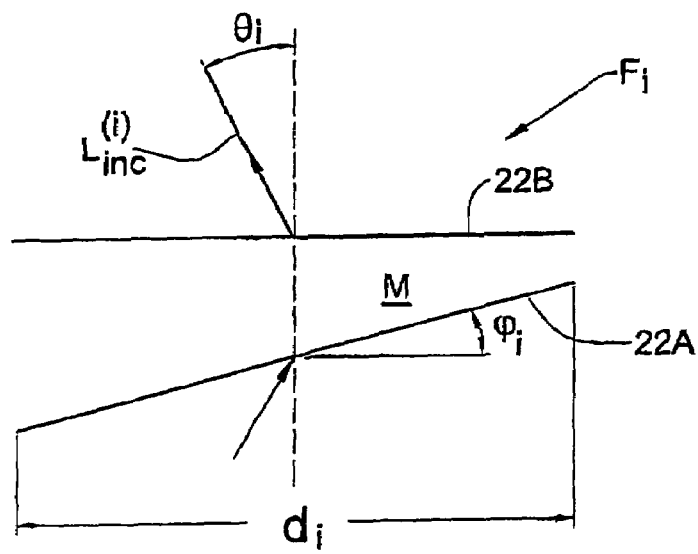
Figure 3C:
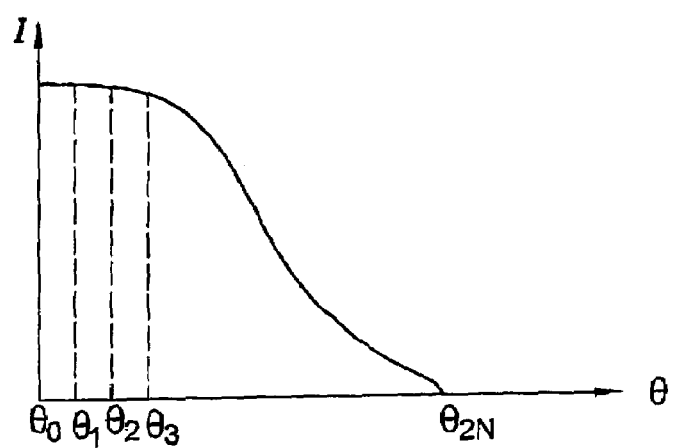

Turning now to FIGS. 3a–3c, there are illustrated the main principles underlying the design of the beam-shaping element 22. In FIG. 3a, one block 23 of the element 22 is exemplified. The block 23 is composed of 2N facets formed by two sets of facets (point-like locations) F and F', each set consisting of N facets, and the sets being identically symmetrical with respect to the central axis CA of the block 23. Thus, the set F is composed of N facets $F_i$ (where i=1, . . . , N), and the identically symmetrical set F' is composed of N facets $F'_i$ (where i=N+1, . . . , 2N).

FIG. 3b illustrates the light propagation through one of the facets $F_i$. The emitted collimated light beam $B_2$ impinges onto the surface region 22a defined by the facet $F_i$ at an angle $\phi_i$, successively passes through the medium M and the interface defined by the second active surface 22b of the facet $F_i$, and ensues from the facet $F_i$ as the light component $L^{(i)}_{inc}$ of the output incident light $L_{inc}$ with the specific angle of propagation $\theta_i$ (i.e., the angular segment of the acute angle of propagation θ of the incident light). The projection $d_i$ of the surface 22a onto the plane of the other active surface 22b that actually defines the length of the facet $F_i$, is determined in accordance with the light intensity $I(\theta_i)$ which should be produced by the light propagation through this facet.

Considering the entire block 23 composed of 2N facets $F_i$, each angle $\phi_i$ will have its corresponding angle $\theta_i$, and, accordingly, the angular intensity distribution $I(\theta)$ of the incident light is formed by the intensities of the 2N light components passed through the 2N facets of the block 23, i.e., $I(\theta_i)$.

FIG. 3c illustrates the angular intensity distribution as produced by the entire block 23 formed by symmetrically-identical facet-sets $F_i$ and $F'_i$.

Thus, in order to provide certain desired angular intensity distribution of the incident light, the facets of the block of the beam-shaping element should be designed accordingly. The algorithm underlying the above design of the block of the beam-shaping element 22 consists of the following. The desired output angular intensity distribution of block 23, $I(\theta)$, is quantized into a discrete set of angles $\theta_i$, each angle defining the tangential of the first active surface 22a which can be found by solving the following transcendental equation:

$$\theta_i = \arcsin\left[n\sin\left(\varphi_i - \arcsin\left(\frac{\sin\varphi_i}{n}\right)\right)\right] \quad (1)$$

wherein $\theta_i$ is the specific angle of propagation of light ensuing from the facet for which the tangential $\phi_i$ must be found.

Taking into account that the length $d_i$ of the corresponding facet $F_i$ for each angle $\theta_i$ is proportional to the relative output intensity at that angle $I(\theta_i)$, each facet $F_i$ of the block 23 is calculated. By this, the desired angular intensity distribution of light ensuing from the beam-shaping element can be obtained.

In order to make the angular intensity distribution of the transmitter unit substantially independent of the linear non-uniformity of the laser diode radiation, the two sets F and F' of successive facets (i.e., $F_1, F_2, \ldots, F_N$, and $F_{N+1}, F_{N+2}, \ldots, F_{2N}$) are identically symmetrical with respect to the central axis CA of the block 23. This is implemented by rotating each facet in one set the angle of 180° with respect to its corresponding facet in the other set (i.e., $F_1$ and $F_{2N}$, $F_2$ and $F_{2N-1}, \ldots, F_N$ and $F_{N+1}$).

The above technique dramatically increases the robustness of the element 22 to the possible linear intensity variation in the laser 18, thereby providing substantially non-sensitivity of the incident light produced by the transmitter unit to any linear intensity variation of light emitted by the laser at the entrance to the beam-shaping element (i.e., at the surface 22a).

It should be noted that in order to further increase the robustness of the beam-shaping element to intensity variations, the entire arrangement of 2N facets (block 23) can be scaled and periodically repeated. The scaling factor and number of periods solely depends on the quality of the laser 18: the less the uniformity of light distribution emitted by the laser, the lower scale and greater number of periods should be used.

Figure 4:
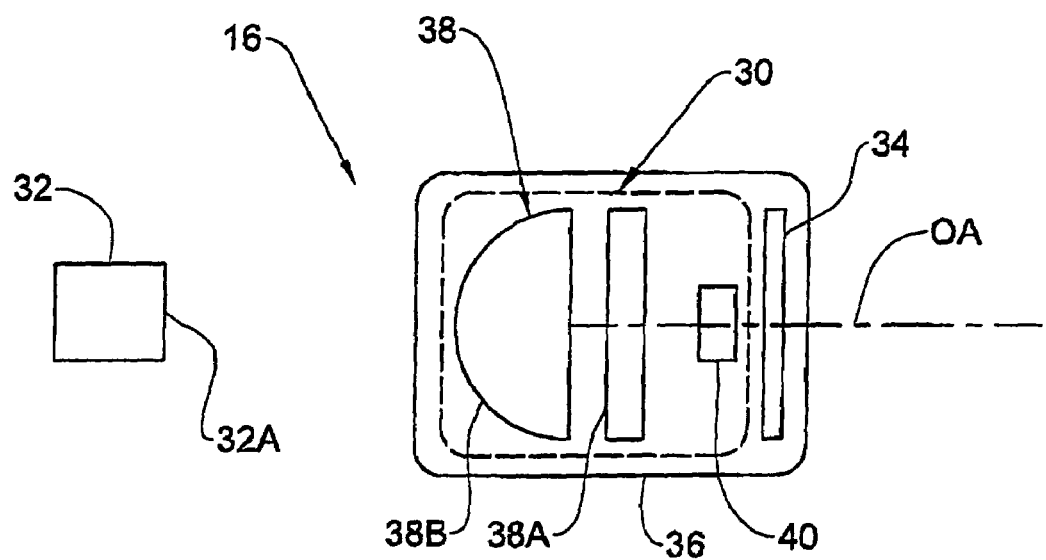
FIG. 4 illustrates the construction of a receiver unit of the system of FIG. 1.

FIG. 4 illustrates the main components of the receiver unit 16, which is of a pseudo-imaging kind. The receiver unit 16 comprises an optical system 30 (constituting a radiation collecting assembly), a detector 32, and a protective window 34 accommodated in front of the optical system 30 (with respect to the direction of propagation of light impinging onto the receiver unit), all being accommodated in a metal housing 36. The optical system 30 is composed of a lens assembly 38 and a laser wavelength matched spectral filter 40 accommodated in front of the lens assembly 38. The lens assembly 38 includes a first aspherical lens 38a and a second spherical lens 38b (with respect to a direction of propagation of the collected radiation through the receiver unit), which are mounted adjacent to each other and define a common optical axis OA of light propagation within the receiver unit towards a sensing surface 32a of the detector 32.

The receiver unit 16, having the above design of the optical system 30, is capable of providing a very large field of view and depth of focus, to meet the requirements of the imaging system. The optical system 30 is capable of creating an image of the detecting window (12 in FIG. 1) on the sensing surface 32a. Angular imaging resolution may vary over the field of view in order to provide the uniform spatial resolution of the detecting window.

The sensing surface 32a of the detector 32 is specifically designed so as to provide a desired sensitivity distribution within the sensing surface 32a of the detector resulting in substantially uniform output from different points on the sensing surface. This is associated with the fact that the design of the detecting window (i.e., its orientation with respect to the optical axis OA) may result in that the detected light components coming from locations (points) in the detecting window differently distanced from the plane of the sensing surface 32a, will have different intensities. Hence, to provide uniform output signals from the detector 32, a specifically constructed variable sensitivity filter should be implemented in the detector 32.

Figure 5:
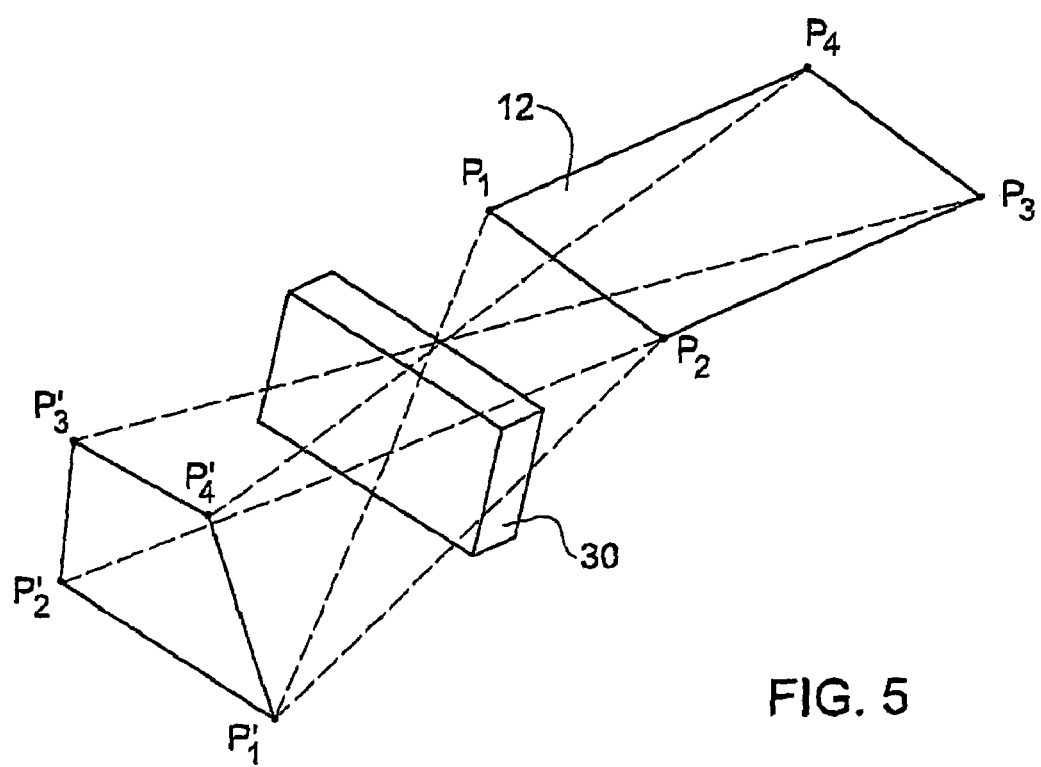
FIG. 5 more specifically illustrates the geometry of a sensing surface of the receiver unit given in an enlarged scale.

As shown in FIG. 5, illustrating the sensing surface 32a in an enlarged scale, the shape of the sensing surface 32a is selected in accordance with the shape of the detecting window 12 by projecting the contours of the detecting window 12 onto the sensing surface 32a through the optical system 30 of the receiver unit 16. In the present example of the rectangular-shaped detecting window 12, the projection of the points $P_1$–$P_4$ results in points $P_{1'}$–$P_{4'}$, forming the trapezoid shape of the sensing surface 32a.

It should be noted, although not specifically shown that, in order to increase the depth of focus, the detector 32 should be oriented such that its sensing surface 32a is not perpendicular to the optical axis OA of the optical system 30, but rather appropriately inclined thereto. The angle of inclination can be determined by any suitable technique, for example, by the least square method, which is known per se.

To enable the light detection with substantially uniform output of the detector, the inventors have developed an iteration algorithm for the calculation of the sensitivity filter function to provide desirably variable sensitivity of the detector. This algorithm consists of the following:

It is known that, in the first approximation, the transmission function of the filter $T_1(x,y)$ can be calculated based on the following formula:

$$T_1(x, y) = c \cdot \frac{R_1 \cdot R_2^2}{I(\theta(\vec{R}_1))} \quad (2)$$

wherein x and y are the coordinates in the filter plane, i.e., the sensing surface 32a; $\vec{R}_1$ is a vector connecting the transmitter unit 14 with a specific point in the detecting window 12; $I(\theta(\vec{R}_1))$ is the intensity of a signal generated by the transmitter unit 14 and transmitted in the $\vec{R}_1$ direction; $\vec{R}_2$ is a vector connecting the specific point in the detecting window 12 with the receiver unit 16; and c is a normalization factor chosen to achieve maximum overall transparency.

The above equation (2), however, does not take into account the actual point spread function (PSF) of the system, which should be taken into account when dealing with the performance of a real system. In this case (i.e., considering the PSF), the intensity distribution $I_1$ of the detector output reads:

$$I_1(x_d, y_d) = \iint_{\substack{over\,the\\detector\\plane}} T_1(x, y)P(x - x_d, y - y_d)dxdy \quad (3)$$

wherein $P(x-x_d, y-y_d)$ is the actual PSF of the optics of the receiver unit, $(x_d, y_d)$ being the coordinates of a current location in the detector plane (sensing surface 32a).

Thus, for each point in the detecting window 12, the corresponding PSF on the detector plane 32a can be found by using the known available ray-tracing code. In the present example, the OSLO SIX software product commercially available from Sinclair Optics Inc., USA was used. Other known codes, such as Zemax or Code V, can be used. Then, this PSF is multiplied by $T_1(x,y)$ and numerically integrated over the entire detector plane, thereby producing an actual signal on the detector (equation (3) above).

This process is repeated for an appropriate grid of points in the detecting window 12, thereby producing the sensitivity map on the detector plane 32a. If PSF were an ideal impulse response, namely delta function, the map of sensitivity would be uniform. In practice, however, owing to the fact that the actual PSF is blurred by real optical system, a uniform sensitivity map cannot be obtained.

In order to achieve the uniform output of the detector, the desirably variable sensitivity map of the detector should be provided. To this end, the iteration algorithm is based on correcting (varying) the transmission function $T_1(x,y)$ by normalizing it with respect to the calculated sensitivity map, thereby producing a new transmission function $T_2(x,y)$:

$$T_2(x_d, y_d) = \frac{T_1(x_d, y_d)}{I_1(x_d, y_d)} \qquad (4)$$

This process is repeated until appropriate uniformity of the detector output is obtained. More specifically, for k-th level of iteration of the transmission function $T_k(x,y)$ (i.e., k-th step of the optimization procedure), the corresponding value of the intensity function $I_k(x,y)$ is calculated as described above (equation (3)), and, accordingly, the next iteration level $T_{k+1}(x,y)$ in the iteration procedure is found. The iteration procedure continues until the required uniformity of the detector output $I(x,y)$ is achieved.

The simulations have shown that the iteration procedure converges very fast (about 5 iterations), producing quite uniform output from the detector (better than 5% P—V).

The above variable transmission (sensitivity) of the detector can be implemented by appropriately patterning the sensing surface 32a of the detector in different ways. For example, the pattern may be fabricated in a separate, specifically coated glass plate and placed on the sensing surface. Alternatively, the correspondent transmission filter (pattern) or the different sensitivity can be implemented directly on the detector by means of ion implantation of the detector's sensing surface (e.g., Si—B).

Those skilled in the art will readily appreciate that various modifications and changes can be applied to the preferred embodiment of the invention as hereinbefore exemplified without departing from its scope defined in and by the appended claims.

What is claimed is:

1. A beam-shaping element for use in a transmitter unit, of a system for monitoring a region of interest, for transmitting radiation with a predetermined angular intensity distribution, wherein the beam-shaping element comprises at least one refractive block having a first active surface for facing a radiation source of the transmitter unit, a second active surface, and an active medium enclosed therebetween, the first active surface of said at least one refractive block being formed by an array of facets, orientation of a surface region of the first active surface defined by each of the facets with respect to the second active surface and a length of said surface region being defined by the predetermined angular intensity distribution, $I(\theta)$, to be produced by radiation propagation through said at least one refractive block, $\theta$ being a steering angle created by the facet of the refractive block.

2. The beam-shaping element of claim 1, wherein said orientation and said length are defined by quantizing the predetermined angular intensity distribution, $I(\theta)$, into a discrete set of angles $\theta_i$, each defining a tangential $\phi_i$ of said surface region by solving a following transcendental equation:

$$\theta_i = \arcsin\left[n\sin\left(\varphi_i - \arcsin\left(\frac{\sin\varphi_i}{n}\right)\right)\right],$$

$\theta_i$ being a specific angle of propagation of radiation ensuing from the $i^{th}$ facet; and calculating each of the facets taking into account that a projection of said surface region of each facet onto the second active surface is proportional to a relative output intensity at the corresponding angle.

3. The beam-shaping element of claim 1, wherein said array of facets of the refractive block is composed of two sets, which are symmetrically-identical with respect to a central axis of the refractive block.

4. The beam-shaping element of claim 2, wherein said array of facets of the refractive block is composed of two sets, which are symmetrically-identical with respect to a central axis of the refractive block.

5. The beam-shaping element of claim 1, comprising at least one additional refractive block, scale and number of the refractive blocks depending on the distribution of radiation, emitted by a radiation source of the transmitter unit, within the first active surface of the beam-shaping element.

6. The beam-shaping element of claim 2, comprising at least one additional refractive block, scale and number of the refractive blocks depending on the distribution of radiation, emitted by a radiation source of the transmitter unit, within the first active surface of the beam-shaping element.

7. The beam-shaping element of claim 3, comprising at least one additional refractive block, scale and number of the refractive blocks depending on the distribution of radiation, emitted by a radiation source of the transmitter unit, within the first active surface of the beam-shaping element.

8. The beam-shaping element of claim 4, comprising at least one additional refractive block, scale and number of the refractive blocks depending on the distribution of radiation, emitted by a radiation source of the transmitter unit, within the first active surface of the beam-shaping element.

9. A transmitter unit for use in a system for monitoring a region of interest, the transmitter unit being configured for transmitting radiation with a predetermined angular intensity distribution, and comprising a radiation source and a beam-shaping element accommodated in a path of radiation emitted by the radiation source, the beam-shaping element comprising at least one refractive block having a first active surface for facing a radiation source of the transmitter unit, a second active surface, and an active medium enclosed therebetween, the first active surface of said at least one refractive block being formed by an array of facets, orientation of a surface region of the first active surface defined by each of the facets with respect to the second active surface and a length of said surface region being defined by the predetermined angular intensity distribution, $I(\theta)$, to be produced by radiation propagation through said at least one refractive block, $\theta$ being a steering angle created by the facet of the refractive block.

10. The transmitter unit of claim 9, wherein said orientation and said length are defined by quantizing the predetermined angular intensity distribution, I(θ), into a discrete set of angles $\theta_i$, each defining a tangential $\phi_i$ of said surface region by solving a following transcendental equation:

$$\theta_i = \arcsin\left[n\sin\left(\varphi_i - \arcsin\left(\frac{\sin\varphi_i}{n}\right)\right)\right],$$

$\theta_i$ being a specific angle of propagation of radiation ensuing from the $i^{th}$ facet; and calculating each of the facets taking into account that a projection of said surface region of each facet onto the second active surface is proportional to a relative output intensity at the corresponding angle.

11. A method for monitoring a region of interest, the method comprising:
(i) transmitting incident radiation towards the region of interest with a certain transmitting angle to define a plane of propagation of the incident radiation, the region of interest being located within said plane, and with a predetermined angular intensity distribution of the incident radiation achieved by passing radiation emitted by a radiation source through a beam-shaping element comprising at least one refractive block having a first active surface facing the radiation source, a second active surface, and an active medium enclosed therebetween, the first active surface of said at least one refractive block being formed by an array of facets, orientation of a surface region of the first active surface defined by each of the facets with respect to the second active surface and a length of said surface region being defined by the predetermined angular intensity distribution, I(θ), to be produced by radiation propagation through said at least one refractive block, θ being a steering angle created by the facet of the refractive block, said orientation and said length being defined by quantizing the predetermined angular intensity distribution, I(θ),into a discrete set of angles $\theta_i$, each defining a tangential $\phi_i$ of said surface region by solving a following transcendental equation $\theta_i$=arcsin[n sin($\phi_i$-arcsin(sin$\phi_i$/n))], wherein $\theta_i$ is a specific angle of propagation of radiation ensuing from the $i^{th}$ facet, and calculating each of the facets taking into account that a projection of said surface region of each facet onto the second active surface is proportional to a relative output intensity at the corresponding angle (ii) collecting reflections of the incident radiation with a solid angle of collection intersecting with said plane, a region of intersection being a detecting window of a predetermined geometry containing at least a portion of said region of interest;

(iii) detecting the collected radiation coming from within said detecting window and generating output signals indicative thereof.

12. The beam-shaping element of claim 1, wherein the length $d_i$ of the corresponding facet $F_i$ for each angle $\theta_i$ is proportional to the relative output intensity at that angle I($\theta_i$), thereby providing the desired angular intensity distribution.

13. The transmitter unit of claim 9, wherein the length $d_i$ of the corresponding facet $F_i$ for each angle $\theta_i$ is proportional to the relative output intensity at that angle I($\theta_i$), thereby providing the desired angular intensity distribution.

14. The beam-shaping element of claim 1, wherein said orientation and said length are defined by quantizing the predetermined angular intensity distribution, I(θ), into a discrete set of angles $\theta_i$, $\theta_i$ defining a tangential $\phi_i$ of said surface region and being a specific angle of propagation of radiation ensuing from the $i^{th}$ facet; and calculating each of the facets taking into account that a projection of said surface region of each facet onto the second active surface is proportional to a relative output intensity at the corresponding angle.

15. The beam-shaping element of claim 9, wherein said orientation and said length are defined by quantizing the predetermined angular intensity distribution, I(θ), into a discrete set of angles $\theta_i$, $\theta_i$ defining a tangential $\phi_i$ of said surface region and being a specific angle of propagation of radiation ensuing from the $i^{th}$ facet; and calculating each of the facets taking into account that a projection of said surface region of each facet onto the second active surface is proportional to a relative output intensity at the corresponding angle.

* * * * *